US011777092B2

(12) United States Patent
Oshima et al.

(10) Patent No.: US 11,777,092 B2
(45) Date of Patent: Oct. 3, 2023

(54) ELECTRODE MATERIAL AND BATTERY

(71) Applicant: Panasonic Intellectual Property Management Co., Ltd., Osaka (JP)

(72) Inventors: Tatsuya Oshima, Osaka (JP); Yuta Sugimoto, Hyogo (JP); Izuru Sasaki, Kyoto (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 16/929,289

(22) Filed: Jul. 15, 2020

(65) Prior Publication Data
US 2020/0343554 A1 Oct. 29, 2020

Related U.S. Application Data

(63) Continuation of application No. PCT/JP2018/046261, filed on Dec. 17, 2018.

(30) Foreign Application Priority Data

Jan. 26, 2018 (JP) .............................. 2018-011524
Jan. 26, 2018 (JP) .............................. 2018-011531
Jan. 26, 2018 (JP) .............................. 2018-011532
Sep. 18, 2018 (JP) .............................. 2018-173449

(51) Int. Cl.
*H01M 4/62* (2006.01)
*H01M 4/133* (2010.01)
*H01M 4/36* (2006.01)
*H01M 4/587* (2010.01)
*H01M 10/0525* (2010.01)
*H01M 10/0562* (2010.01)
*H01M 10/0565* (2010.01)

(52) U.S. Cl.
CPC ............. *H01M 4/62* (2013.01); *H01M 4/133* (2013.01); *H01M 4/366* (2013.01); *H01M 4/587* (2013.01); *H01M 10/0525* (2013.01); *H01M 10/0562* (2013.01); *H01M 10/0565* (2013.01); *H01M 2300/008* (2013.01); *H01M 2300/0071* (2013.01); *H01M 2300/0082* (2013.01); *H01M 2300/0094* (2013.01)

(58) Field of Classification Search
None
See application file for complete search history.

(56) References Cited

U.S. PATENT DOCUMENTS

| | | | |
|---|---|---|---|
| 2005/0191550 A1* | 9/2005 | Satoh | H01M 4/621 429/332 |
| 2013/0177821 A1 | 7/2013 | Tsuchida et al. | |
| 2014/0050980 A1* | 2/2014 | Kang | H01M 4/622 429/211 |
| 2014/0127567 A1* | 5/2014 | Kuriki | H01G 11/42 427/126.3 |
| 2014/0308572 A1 | 10/2014 | Tsuchida et al. | |
| 2015/0030928 A1* | 1/2015 | Kwak | H01M 4/505 264/618 |
| 2015/0162604 A1* | 6/2015 | Park | H01M 4/1393 252/182.1 |
| 2016/0013479 A1 | 1/2016 | Iwasaki | |
| 2016/0079597 A1* | 3/2016 | Fujiki | H01M 10/0525 429/304 |
| 2016/0315353 A1 | 10/2016 | Matsushita et al. | |
| 2017/0018761 A1* | 1/2017 | Ogino | H01M 4/625 |
| 2020/0328467 A1 | 10/2020 | Sasaki et al. | |
| 2022/0045318 A1* | 2/2022 | Sasaki | H01M 4/131 |

FOREIGN PATENT DOCUMENTS

| | | | |
|---|---|---|---|
| EP | 1 575 104 | * | 9/2005 |
| EP | 3076459 | A1 | 10/2016 |
| JP | 2001-015115 | * | 1/2001 |
| JP | 2006-244734 | | 9/2006 |
| JP | 2012-048971 | | 3/2012 |
| JP | 2014-146458 | A | 8/2014 |
| JP | 2016-207570 | | 12/2016 |
| JP | 2017-004910 | | 1/2017 |
| JP | 2017-111954 | | 6/2017 |
| WO | 2016/035713 | | 3/2016 |
| WO | 2019/135322 | A1 | 7/2019 |

OTHER PUBLICATIONS

Asano, T.; Sakai, A.; Satoru, O.; Sakaida, M.; Miyazaki, A.; Hasegawa, S.—Solid Halide Electrolytes with High Lithium-Ion Conductivity for Application in 4V Class Bulk-Type All-Solid-State Batteries, Adv. Mater, 2018, 30, 1803075, published online on Sep. 14, 2018 (Year: 2018).*

Park, K-H; Kaup, K.; Assoud, A.; Zhang, Q.; Wu, X.; Nazar, L.F.—High-Voltage Superionic Halide Solid Electrolytes for All-Solid-State Li-Ion Batteries, ACS Energt Lett, 2020, 5, pp. 533-539 (Year: 2020).*

Tomita, Y.; Matsushita, H; Maeda, Y.; Kobayashi, K.; Yamada, K.—Synthesis and Characterization of Lithium Ion Conductors, Li3InBr6 and Its Substituted Compounds, Defect and Diffusion Forum, ISSN:1662-9507, vols. 242-244, pp. 17-26, available online on Sep. 30, 2005 (Year: 2005).*

Machine translation of JP 2001-015115, published on Jan. 19, 2001 (Year: 2001).*

(Continued)

*Primary Examiner* — Anca Eoff
(74) *Attorney, Agent, or Firm* — McDermott Will & Emery LLP

(57) ABSTRACT

An electrode material includes an electrode active material, a first solid electrolyte material, and a coating material. The first solid electrolyte material includes Li, M, and X and does not include sulfur, where M includes at least one selected from the group consisting of metal elements other than Li and metalloid elements, and X is at least one selected from the group consisting of Cl, Br, and I. The coating material is located on the surface of the electrode active material.

6 Claims, 1 Drawing Sheet

(56) References Cited

OTHER PUBLICATIONS

Song, D., Jo, M.R., Lee, G.-H., Song, J., Choi, N.-S., Kang, Y.-M.—Bifunctional Li4Ti5O12 coating layer for the enhanced kinetics and stability of carbon anode for lithium rechargeable batteries, Journal of Alloys and Compounds 615 (2014), pp. 220-226 (Year : 2014).*

International Search Report of PCT application No. PCT/JP2018/046261 dated Mar. 19, 2019.

Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

The Extended European Search Report dated Jan. 29, 2021 for the related European Patent Application No. 18902418.5.

Tomita Y et al: "Substitution effect of ionic conductivity in lithium ion conductor, LI "3INBR"6"-"xCL"x", Solid State Ionics, North Holland Pub. Company. Amsterdam; NL, NL, vol. 179, No. 21-26, Sep. 15, 2008 (Sep. 15, 2008), pp. 867-870, XP023521183.

* cited by examiner

ELECTRODE MATERIAL AND BATTERY

CROSS-REFERENCE TO RELATED APPLICATIONS

This application is a continuation of PCT/JP2018/046261 filed on Dec. 17, 2018, which claims priority to Japanese Patent Application No. 2018-011524, No. 2018-011531 and No. 2018-011532 filed on Jan. 26, 2018 and Japanese Patent Application No. 2018-173449 filed on Sep. 18, 2018.

BACKGROUND

1. Technical Field

The present disclosure relates to an electrode material for batteries and a battery.

2. Description of the Related Art

Patent Literature 1 discloses a battery using, as a solid electrolyte, a halide including indium.

CITATION LIST

Patent Literature

Patent Literature 1: Japanese Patent Application Publication NO. 2006-244734
Patent Literature 2: Japanese Patent Application Publication NO. 2016-207570

SUMMARY

In known techniques, it is desired to further improve the charge/discharge efficiency of a battery.

In one general aspect, the techniques disclosed here feature an electrode material including an electrode active material, a first solid electrolyte material, and a coating material, wherein the first solid electrolyte material includes Li, M, and X and does not include sulfur, where M includes at least one selected from the group consisting of metal elements other than Li and metalloid elements, and X is at least one selected from the group consisting of Cl, Br, and I; and the coating material is located on the surface of the electrode active material.

According to the present disclosure, the charge/discharge efficiency of the battery can be improved.

DETAILED DESCRIPTION OF THE EMBODIMENTS

Figure 1:
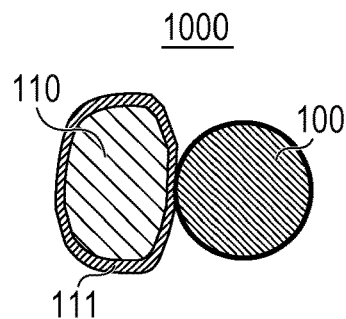
FIG. 1 is a cross-sectional view illustrating a schematic configuration of an electrode material 1000 according to Embodiment 1.

Embodiments of the present disclosure will now be described with reference to the drawings.

Embodiment 1

The electrode material according to Embodiment 1 includes an electrode active material, a first solid electrolyte material, and a coating material.

The first solid electrolyte material is a material represented by the following compositional formula (1):

$$Li_\alpha M_\beta X_\gamma \qquad \text{Formula (1)}$$

where, $\alpha$, $\beta$, and $\gamma$ are all values larger than 0.

M includes at least one selected from the group consisting of metal elements other than Li and metalloid elements.

X is at least one selected from the group consisting of Cl, Br, and I.

The coating material is located on the surface of the electrode active material.

According to the above configuration, the charge/discharge efficiency of the battery can be improved.

Patent Literature 1 mentions that in an all-solid secondary battery including a solid electrolyte made of a compound including indium, the potential of the positive electrode active material relative to Li is preferably 3.9 V or less on average, the potential of the negative electrode active material relative to Li is preferably 0.7 V or less on average, and a film made of a degradation product by oxidative decomposition and reductive decomposition of the electrolyte is consequently well formed to provide good charge/discharge characteristics. In addition, layered transition metal oxides for general positive electrodes, such as $LiCoO_2$ and $LiNi_{0.8}Co_{0.15}Al_{0.05}O_2$, are disclosed as the positive electrode active material having a potential of 3.9 V or less relative to Li on average, and general negative electrode active materials, such as Li metal and carbon active materials, are disclosed as the negative electrode active material having a potential of 0.7 V or less relative to Li on average. In addition, the detailed mechanisms of the oxidative decomposition and the reductive decomposition are not clarified.

In contrast, the present inventors intensively studied and, as a result, found that a battery using a halide solid electrolyte (i.e., first solid electrolyte material) as a positive electrode material has a problem that, even if a positive electrode active material having a potential of 3.9 V or less relative to Li on average is used, the halide solid electrolyte is oxidatively decomposed during charging, and the charge/discharge efficiency of the battery is accordingly reduced, and the cause thereof lies in the oxidation of the halogen element included in the halide solid electrolyte. Specifically, in addition to the normal charging reaction of extracting lithium and electrons from the positive electrode active material in the positive electrode material, a side reaction of extracting electrons also from the halide solid electrolyte being in contact with the positive electrode active material is caused, and the charge is consumed by the side reaction. Consequently, the charge/discharge efficiency is probably reduced.

In addition, it is conceived that with the oxidation of the halide solid electrolyte, an oxidized layer having poor lithium ion conductivity is formed between the positive electrode active material and the halide solid electrolyte and functions as a large interface resistance in the electrode reaction of the positive electrode. In order to solve this problem, it is necessary to suppress the extraction of electrons by the halide solid electrolyte and to prevent the oxidized layer formation.

In addition, it was found that a battery using a halide solid electrolyte as a negative electrode material has a problem that, even if a negative electrode active material having a potential of 0.7 V or less relative to Li on average is used, the halide solid electrolyte is reductively decomposed during charging, and the charge/discharge efficiency of the battery is accordingly reduced, and the cause thereof lies in the reduction of the metal element included in the halide solid electrolyte. Specifically, in addition to the normal charging reaction of inserting lithium into and receiving electrons by the negative electrode active material in the negative electrode material, a side reaction of receiving electrons also by the halide solid electrolyte being in contact with the negative electrode active material is caused, and the charge is consumed by the side reaction. The charge/discharge efficiency is probably reduced as a result. In order to solve this problem, it is necessary to suppress the receiving of electrons by the halide solid electrolyte and to prevent the reduced layer formation.

In the configuration of the present disclosure, a coating material lies between the electrode active material and the halide solid electrolyte. This coating material prevents giving and receiving of electrons by the halide solid electrolyte. Consequently, the side reaction of the halide solid electrolyte is not caused, and the charge/discharge efficiency can be improved.

Incidentally, the "metalloid elements" are B, Si, Ge, As, Sb, and Te.

In addition, the "metal elements" are all elements excluding hydrogen in groups 1 to 12 of the periodic table and all elements in groups 13 to 16 excluding B, Si, Ge, As, Sb, Te, C, N, P, O, S, and Se, i.e., refer to a group consisting of elements that can become cations when forming inorganic compounds with halogen compounds.

Further, in the compositional formula (1), M may include Y (yttrium).

That is, the first solid electrolyte material may include Y as a metal element.

According to the configuration above, the ion conductivity of the first solid electrolyte material can be further improved. Consequently, the charge/discharge characteristics of the battery can be further improved.

The first solid electrolyte material including Y may be, for example, a compound represented by a compositional formula: $Li_aMe_bY_cX_6$ (a+mb+3c=6 and c>0 are satisfied) (Me: at least one of metal elements other than Li and Y and metalloid elements) (m: valence of Me).

Me may be at least one selected from the group consisting of Mg, Ca, Sr, Ba, Zn, Sc, Al, Ga, Bi, Zr, Hf, Ti, Sn, Ta, and Nb.

According to the configuration above, the ion conductivity of the first solid electrolyte material can be further improved.

Further, in the compositional formula (1), $2 \leq \gamma/\alpha \leq 2.4$ may be satisfied.

According to the configuration above, the ion conductivity of the first solid electrolyte material can be further improved. Consequently, the charge/discharge characteristics of the battery can be further improved.

Further, in the compositional formula (1), $2.5 \leq \alpha \leq 3$, $1 \leq \beta \leq 1.1$, and $\gamma = 6$ may be satisfied.

Alternatively, in the compositional formula (1), $2.5 \leq \alpha \leq 2.7$, $1 \leq \beta \leq 1.1$, and $\gamma = 6$ may be satisfied.

Alternatively, in the compositional formula (1), $\alpha = 2.7$, $\beta = 1.1$, and $\gamma = 6$ may be satisfied.

According to the configuration above, the ion conductivity of the first solid electrolyte material can be further improved. Consequently, the charge/discharge characteristics of the battery can be further improved.

Further, in the compositional formula (1), X may include Cl (chlorine).

According to the configuration above, the ion conductivity of the first solid electrolyte material can be further improved. Consequently, the charge/discharge characteristics of the battery can be further improved.

Further, the first solid electrolyte material may be a material represented by the following compositional formula (A1).

$$Li_{6-3d}Y_dX_6 \qquad \text{Formula (A1)}$$

Here, in the compositional formula (A1), X is two or more elements selected from the group consisting of Cl, Br, and I. In addition, in the compositional formula (A1), 0<d<2 is satisfied.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A2).

$$Li_3YX_6 \qquad \text{Formula (A2)}$$

Here, in the compositional formula (A2), X is two or more elements selected from the group consisting of Cl, Br, and I.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A3).

$$Li_{3-3\delta}Y_{1+\delta}Cl_6 \qquad \text{Formula (A3)}$$

Here, in the compositional formula (A3), $0<\delta \leq 0.15$, is satisfied.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A4).

$$Li_{3-3\delta}Y_{1+\delta}Br_6 \qquad \text{Formula (A4)}$$

Here, in the compositional formula (A4), $0<\delta \leq 0.25$ is satisfied.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A5).

$$Li_{3-3\delta+a}Y_{1+\delta-a}Me_aCl_{6-x-y}Br_xI_y \quad \text{Formula (A5)}$$

Here, in the compositional formula (A5), Me is at least one element selected from the group consisting of Mg, Ca, Sr, Ba, and Zn.

In addition, in the compositional formula (A5), the followings are satisfied:

$-1<\delta<2$, $0<a<3$, $0<(3-3\delta+a)$, $0<(1+\delta-a)$, $0 \leq x \leq 6$, $0 \leq y \leq 6$, and $(x+y) \leq 6$.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A6).

$$Li_{3-3\delta}Y_{1+\delta-a}Me_aCl_{6-x-y}Br_xI_y \quad \text{Formula (A6)}$$

Here, in the compositional formula (A6), Me is at least one element selected from the group consisting of Al, Sc, Ga, and Bi.

In addition, in the compositional formula (A6), the followings are satisfied:

$-1<\delta<1$, $0<a<2$, $0<(1+\delta-a)$, $0 \leq x \leq 6$, $0 \leq y \leq 6$, and $(x+y) \leq 6$.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A7).

$$Li_{3-3\delta-a}Y_{1+\delta-a}Me_aCl_{6-x-y}Br_xI_y \quad \text{Formula (A7)}$$

Here, in the compositional formula (A7), Me is at least one element selected from the group consisting of Zr, Hf, and Ti.

In addition, in the compositional formula (A7), the followings are satisfied:

$-1<\delta<1$, $0<a<1.5$, $0<(3-3\delta-a)$, $0<(1+\delta-a)$, $0 \leq x \leq 6$, $0 \leq y \leq 6$, and $(x+y) \leq 6$.

According to the configuration above, the ion conductivity of the first solid electrolyte material can be further improved. Consequently, the charge/discharge characteristics of the battery can be further improved.

Further, the first solid electrolyte material may be a material represented by the following compositional formula (A8).

$$Li_{3-3\delta-2a}Y_{1+\delta-a}Me_aCl_{6-x-y}Br_xI_y \quad \text{Formula (A8)}$$

Here, in the compositional formula (A8), Me is at least one element selected from the group consisting of Ta and Nb.

In addition, in the compositional formula (A8), the followings are satisfied:

$-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$.

According to the configuration above, the ion conductivity of the first solid electrolyte material can be further improved. Consequently, the charge/discharge characteristics of the battery can be further improved.

Further, as the first solid electrolyte material, for example, $Li_3YX_6$, $Li_2MgX_4$, $Li_2FeX_4$, $Li(Al, Ga, In)X_4$, or $Li_3(Al, Ga, In)X_6$ can be used. Here, X includes at least one element selected from the group consisting of Cl, Br, and I.

The electrode active material includes a positive electrode active material or a negative electrode active material.

The electrode active material may include a negative electrode active material.

Further, the effect of suppressing the side reaction of the first solid electrolyte material by providing a coating layer is significant when the electrode active material includes a negative electrode active material and can further enhance the charge/discharge efficiency of the battery.

The negative electrode active material may have characteristics of occluding and releasing a metal ion (e.g., lithium ion). As the negative electrode active material, for example, a metal material, a carbon material, an oxide, a nitride, a tin compound, or a silicon compound can be used. The metal material may be a single metal or may be an alloy. Examples of the metal material include lithium metal and lithium alloys. Examples of the carbon material include natural graphite, coke, graphitized carbon, carbon fiber, spherical carbon, artificial graphite, and amorphous carbon. From the viewpoint of capacity density, silicon (Si), tin (Sn), silicon compounds, and tin compounds can be suitably used.

Further, in Embodiment 1, the negative electrode active material may be graphite.

According to the configuration above, the cycle performance, the energy density, and the charge/discharge efficiency of the battery can be further enhanced.

The positive electrode active material may have characteristics of occluding and releasing a metal ion (e.g., lithium ion). As the positive electrode active material, for example, a lithium-containing transition metal oxide (e.g., Li(NiCoAl)O$_2$, Li(NiCoMn)O$_2$, or LiCoO$_2$), a transition metal fluoride, a polyanion or fluorinated polyanion material, a transition metal sulfide, a transition metal oxysulfide, or a transition metal oxynitride can be used. In particular, when the lithium-containing transition metal oxide is used as the positive electrode active material, the manufacturing cost can be reduced, and the average discharge voltage can be increased.

As the coating material, a material having low electron conductivity can be used. As the coating material, for example, a sulfide solid electrolyte, a polymer solid electrolyte, or an oxide material can be used.

As the sulfide solid electrolyte, for example, Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, or Li$_{10}$GeP$_2$S$_{12}$ can be used. In addition, for example, LiX (X: F, Cl, Br, or I), Li$_2$O, MO$_q$, or Li$_p$MO$_q$ (M: any one of P, Si, Ge, B, Al, Ga, In, Fe, and Zn) (p, q: natural number) may be added to the above-mentioned sulfide solid electrolytes.

Further, in Embodiment 1, the coating material may be a sulfide solid electrolyte. For example, the sulfide solid electrolyte may include lithium sulfide and phosphorus sulfide. For example, sulfide solid electrolyte may be Li$_2$S—P$_2$S$_5$.

Li$_2$S—P$_2$S$_5$ has high ion conductivity and is stable against oxidation and reduction. Accordingly, the charge/discharge efficiency of the battery can be further improved by using Li$_2$S—P$_2$S$_5$.

As the polymer solid electrolyte, for example, a composite compound of a polymer compound and a lithium salt can be used. The polymer compound may have an ethylene oxide structure. A polymer compound having an ethylene oxide structure can contain a large amount of the lithium salt and can further enhance the ion conductivity. As the lithium salt, for example, LiPF$_6$, LiBF$_4$, LiSbF$_6$, LiAsF$_6$, LiSO$_3$CF$_3$ (hereinafter, referred to as LiTFS), LiN(SO$_2$F)$_2$ (hereinafter, referred to as LiFSI), LiN(SO$_2$CF$_3$)$_2$ (hereinafter, referred to as LiTFSI), LiN(SO$_2$C$_2$F$_5$)$_2$, LiN(SO$_2$CF$_3$)(SO$_2$C$_4$F$_9$), or LiC(SO$_2$CF$_3$)$_3$ can be used. As the lithium salt, one lithium salt selected from the above may be used alone. Alternatively, as the lithium salt, a mixture of two or more lithium salts selected from the above may be used.

Further, in Embodiment 1, the coating material may be a polymer solid electrolyte. For example, the polymer solid electrolyte may be a composite compound of polyethylene oxide (PEO) and a lithium salt. For example, the lithium salt may be lithium bis(trifluoromethanesulfonyl)imide (i.e., LiFSI).

The PEO-LiFSI composite compound has high ion conductivity and is stable against oxidation and reduction. Accordingly, the charge/discharge efficiency of the battery can be further improved by using PEO-LiFSI.

As the oxide material, for example, SiO$_2$, Al$_2$O$_3$, TiO$_2$, B$_2$O$_3$, Nb$_2$O$_5$, WO$_3$, or ZrO$_2$ can be used.

Further, the oxide material may be an oxide solid electrolyte or oxynitride solid electrolyte having lithium ion conductivity. As the oxide solid electrolyte, for example, a Li—P—O compound such as Li$_3$PO$_4$, a Li—Nb—O compound such as LiNbO$_3$, a Li—B—O compound such as LiBO$_2$ or Li$_3$BO$_3$, a Li—Al—O compound such as LiAlO$_2$, a Li—Si—O compound such as Li$_4$SiO$_4$, a Li—S—O compound such as Li$_2$SO$_4$, a Li—Ti—O compound such as Li$_4$Ti$_5$O$_{12}$, a Li—Zr—O compound such as Li$_2$ZrO$_3$, a Li—Mo—O compound such as Li$_2$MoO$_3$, a Li-V-O compound such as LiV$_2$O$_5$, or a Li—W—O compound such as Li$_2$WO$_4$ can be used. As the oxynitride solid electrolyte, for example, a Li—P—O—N compound such as lithium phosphate oxynitride (LiPON) can be used.

Further, in Embodiment 1, the coating material may be an oxide solid electrolyte. For example, the oxide solid electrolyte may be trilithium phosphate.

Trilithium phosphate has high ion conductivity and is stable against oxidation and reduction. Accordingly, the charge/discharge efficiency of the battery can be further improved by using trilithium phosphate.

FIG. 1 is a cross-sectional view illustrating a schematic configuration of an electrode material 1000 according to Embodiment 1.

The electrode material 1000 in Embodiment 1 includes a first solid electrolyte particle 100, an electrode active material particle 110, and a coating layer 111.

The electrode active material particle 110 and the first solid electrolyte particle 100 are separated from each other by the coating layer 111 and are not in direct contact with each other.

The coating layer 111 is a layer including a coating material. That is, the coating layer 111 is provided on the surface of the electrode active material particle 110.

Further, the coating layer 111 may have a thickness of 1 nm or more and 100 nm or less.

When the coating layer 111 has a thickness of 1 nm or more, it is possible to prevent the electrode active material particle 110 and the first solid electrolyte particle 100 from direct contact to suppress the side reaction of the first solid electrolyte material. Consequently, the charge/discharge efficiency can be improved.

In addition, when the coating layer 111 has a thickness of 100 nm or less, the thickness of the coating layer 111 does not become too large. Accordingly, the internal resistance of the battery can be sufficiently reduced. As a result, the energy density of the battery can be increased.

Further, the coating layer 111 may uniformly coat the electrode active material particle 110. Direct contact between the electrode active material particle 110 and the first solid electrolyte particle 100 can be prevented to suppress the side reaction of the first solid electrolyte material. Consequently, the charge/discharge efficiency can be improved.

Alternatively, the coating layer 111 may partially coat the electrode active material particle 110. A plurality of the electrode active material particles 110 are in direct contact with each other via the portion where the coating layer 111 is not present to improve the electron conductivity between the electrode active material particles 110. Consequently, high power operation of the battery is possible.

In addition, the shape of the first solid electrolyte particle 100 in Embodiment 1 is not particularly limited and may be, for example, needle-like, spherical, or elliptical spherical. For example, when the shape of the first solid electrolyte particle 100 in Embodiment 1 is spherical, the median size may be 100 μm or less. When the median size is 100 μm or less, the electrode active material particle 110 and the first solid electrolyte particle 100 can form a good dispersion state in the electrode material. Consequently, the charge/discharge characteristics is improved. In addition, in Embodiment 1, the median size may be 10 μm or less.

According to the configuration above, in the electrode material, the electrode active material particle 110 and the first solid electrolyte particle 100 can form a good dispersion state.

In addition, in Embodiment 1, the first solid electrolyte particle 100 may be smaller than the median size of the electrode active material particle 110.

According to the configuration above, in the electrode, the first solid electrolyte particle 100 and the electrode active material particle 110 can form a better dispersion state.

The median size of the electrode active material particle 110 may be 0.1 μm or more and 100 μm or less.

When the electrode active material particle 110 has a median size of 0.1 μm or more, in the electrode material, the electrode active material particle 110 and the first solid electrolyte particle 100 can form a good dispersion state. As a result, the charge/discharge characteristics of the battery are improved. In addition, when the electrode active material particle 110 has a median size of 100 μm or less, the lithium diffusion in the electrode active material particle 110 is fast. Consequently, the battery can operate at high power.

The median size of the electrode active material particle 110 may be larger than that of the first solid electrolyte particle 100. In such a case, the electrode active material particle 110 and the first solid electrolyte particle 100 can form a good dispersion state.

Further, in the electrode material 1000 according to Embodiment 1, the first solid electrolyte particle 100 and the coating layer 111 may be in contact with each other as shown in FIG. 1.

In addition, the electrode material 1000 in Embodiment 1 may include multiple first solid electrolyte particles 100 and multiple electrode active material particles 110.

In addition, in the electrode material 1000 according to Embodiment 1, the content of the first solid electrolyte particle 100 and the content of the electrode active material particle 110 may be the same as or different from each other.

The method for forming the coating layer 111 on the electrode active material particle 110 is not particularly limited. For example, when a sulfide solid electrolyte is used as the coating layer 111, examples of the method include mechanical pulverization and mixing of the electrode active material particle 110 and the coating layer 111. The mixing method may be either a dry method or a wet method. In particular, dry mixing can simply produce a coating layer.

When a polymer solid electrolyte is used as the coating layer 111, for example, the electrode active material particle 110 is dispersed in a coating material solution of the coating layer 111 and is dried. In such a method, the coating layer can be simply and uniformly formed.

When an oxide material is used as the coating layer 111, examples of the method include an evaporation method. The evaporation method may be either a CVD method or a PVD method. For example, an atomic layer deposition method (ALD method), which is one type of the CVD method, or a sputtering method, which is one type of the PVD method, is used. However, the combination of the material used as the coating layer 111 and the method for forming it on the electrode active material particle 110 is not limited to the above-described examples, and the coating layer 111 may be formed by another combination. Method for manufacturing first solid electrolyte material The first solid electrolyte material in Embodiment 1 can be manufactured by, for example, the following method.

Raw material powders of binary halides are prepared so as to have the mix proportion of a desired composition. For example, when $Li_3YCl_6$ is produced, $LiCl$ and $YCl_3$ are prepared at a mole ratio of 3:1.

On this occasion, "M", "Me", and "X" in the above-described compositional formula can be determined by selecting the types of the raw material powders. In addition, the above-described values "α", "β", "γ", "d", "δ", "a", "x", and "y" can be adjusted by adjusting the raw material, mix proportion, and synthesis process.

After sufficient mixing of the raw material powders, the raw material powders are mixed, pulverized, and reacted with each other by a mechanochemical milling method. Alternatively, the raw material powders are sufficiently mixed and may be then sintered.

Consequently, a solid electrolyte material including a crystalline phase as described above can be obtained.

Further, the configuration of the crystalline phase (i.e., crystalline structure) in the solid electrolyte material can be determined by adjusting the reaction method between the raw material powders and the reaction conditions.

Embodiment 2

Embodiment 2 will now be described. Description overlapping with the above-described Embodiment 1 will be appropriately omitted.

Figure 2:
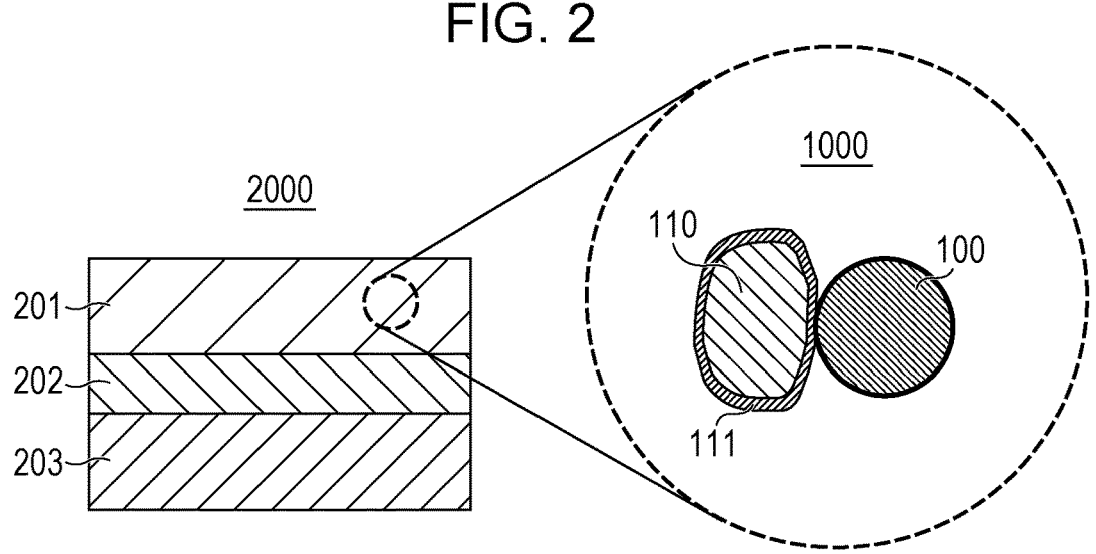
FIG. 2 is a cross-sectional view illustrating a schematic configuration of a battery 2000 according to Embodiment 2.
Figure 3:
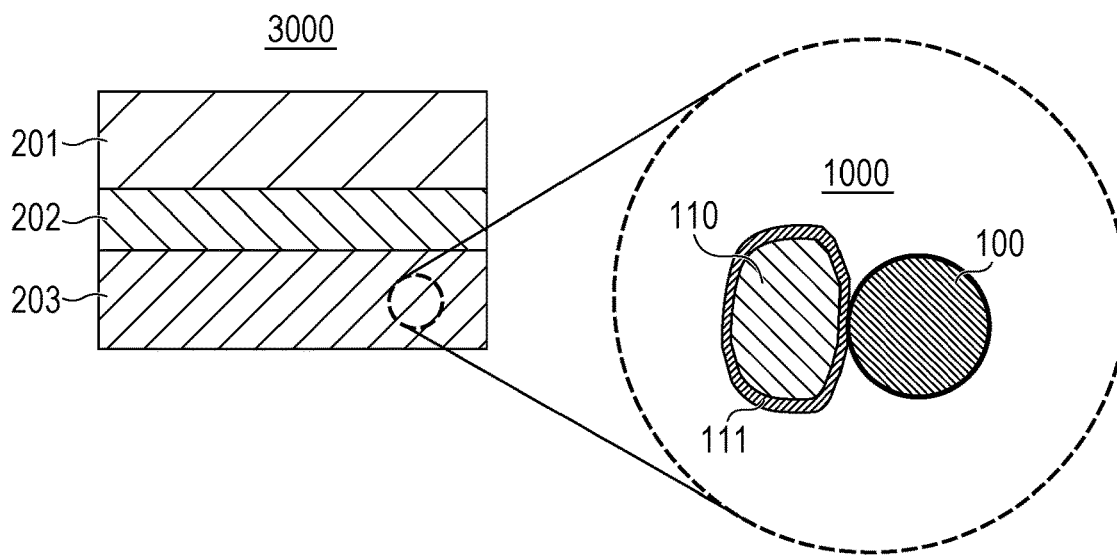
FIG. 3 is a cross-sectional view illustrating a schematic configuration of a battery 3000 according to Embodiment 2.

FIG. 2 is a cross-sectional view illustrating a schematic configuration of a battery 2000 according to Embodiment 2. FIG. 3 is a cross-sectional view illustrating a schematic configuration of a battery 3000 according to Embodiment 2.

The battery 2000 in Embodiment 2 includes a positive electrode 201, an electrolyte layer 202, and a negative electrode 203.

At least one of the positive electrode 201 and the negative electrode 203 includes the electrode material (e.g., electrode material 1000) in Embodiment 1 described above. FIG. 2 shows the battery 2000 in which the positive electrode 201 includes the electrode material 1000, and FIG. 3 shows the battery 3000 in which the negative electrode 203 includes the electrode material 1000.

The electrolyte layer 202 is disposed between the positive electrode 201 and the negative electrode 203.

According to the configuration above, the charge/discharge efficiency of the battery can be improved.

Further, the electrode material in Embodiment 1 described above can be used as a negative electrode material or a positive electrode material. More preferably, the electrode material in Embodiment 1 described above can be used as the negative electrode material.

According to the configuration above, the charge/discharge efficiency of the battery can be further improved.

When the positive electrode 201 includes the electrode material 1000, the volume ratio, "v: 100−v", of the electrode active material particle 110 and the first solid electrolyte particle 100 included in the positive electrode 201 may satisfy 30≤v≤95. When v≥30 is satisfied, a sufficient energy density of the battery can be secured. In addition, when v≤95 is satisfied, operation at high power can be realized.

When the negative electrode 203 includes the electrode material 1000, the volume ratio, "v: 100−v", of the electrode active material particle 110 and the first solid electrolyte particle 100 included in the negative electrode 203 may satisfy 30≤v≤95. When v≥30 is satisfied, a sufficient energy density of the battery can be secured. In addition, when v≤95 is satisfied, operation at high power may be difficult.

The positive electrode 201 may have a thickness of 10 μm or more and 500 μm or less. Further, when the positive electrode 201 has a thickness of 10 μm or more, a sufficient energy density of the battery can be secured. Further, when the positive electrode 201 has a thickness of 500 μm or less, operation at high power can be realized.

The negative electrode 203 may have a thickness of 10 μm or more and 500 μm or less. Further, when the negative electrode 203 has a thickness of 10 μm or more, a sufficient energy density of the battery can be secured. Further, when the negative electrode 203 has a thickness of 500 μm or less, operation at high power can be realized.

The electrolyte layer 202 is a layer including an electrolyte material. The electrolyte material is, for example, a solid electrolyte material (i.e., second solid electrolyte material). That is, the electrolyte layer 202 may be a solid electrolyte layer.

As the second solid electrolyte material included in the electrolyte layer 202, a halide solid electrolyte, a sulfide solid electrolyte, an oxide solid electrolyte, a polymer solid electrolyte, or a complex hydride solid electrolyte may be used.

As the halide solid electrolyte, the first solid electrolyte material in Embodiment 1 described above may be used. That is, the electrolyte layer 202 may include the first solid electrolyte material in Embodiment 1 described above.

According to the configuration above, the charge/discharge characteristics of the battery can be further improved.

In addition, the second solid electrolyte material included in the electrolyte layer 202 may be a halide solid electrolyte material that is different from the first solid electrolyte material in Embodiment 1 described above. That is, the electrolyte layer 202 may include a halide solid electrolyte material that is different from the first solid electrolyte material in Embodiment 1 described above.

According to the configuration above, the charge/discharge characteristics of the battery can be further improved.

As the sulfide solid electrolyte, the sulfide solid electrolytes exemplified as the coating material in Embodiment 1 may be used.

Specifically, as the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. In addition, for example, LiX (X: F, Cl, Br, or I), $Li_2O$, $MO_q$, or $Li_pMO_q$ (M: any one of P, Si, Ge, B, Al, Ga, In, Fe, and Zn) (p, q: natural number) may be added to the above-mentioned sulfide solid electrolytes.

As the oxide solid electrolyte, the oxide solid electrolytes exemplified as the coating material in Embodiment 1 may be used.

Specifically, as the oxide solid electrolyte, for example, a NASICON-type solid electrolyte represented by $LiTi_2(PO_4)_3$ and element substitutes thereof, a $(LaLi)TiO_3$-based perovskite solid electrolyte, a LISICON-type solid electrolyte represented by $Li_{14}ZnGe_4O_{16}$, $Li_4SiO_4$, and $LiGeO_4$ and element substitutes thereof, a garnet-type solid electrolyte represented by $Li_7La_3Zr_2O_{12}$ and element substitutes thereof, $Li_3N$ and H substitutes thereof, $Li_3PO_4$ and N substitutes thereof, or glass or glass ceramic mainly made of a Li—B—O compound, such as $LiBO_2$ or $Li_3BO_3$, and containing $Li_2SO_4$, $Li_2CO_3$, or the like can be used.

As the polymer solid electrolyte, the polymer solid electrolytes exemplified as the coating material in Embodiment 1 may be used.

Specifically, as the polymer solid electrolyte, for example, a compound of a polymer compound and a lithium salt may be used. The polymer compound may have an ethylene oxide structure. A polymer compound having an ethylene oxide structure can contain a large amount of the lithium salt and can further enhance the ion conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from the above may be used alone. Alternatively, as the lithium salt, a mixture of two or more lithium salts selected from the above may be used.

As the complex hydride solid electrolyte, for example, $LiBH_4$—LiI or $LiBH_4$—$P_2S_5$ can be used.

Further, the solid electrolyte layer may include a second solid electrolyte material as a main component. That is, the solid electrolyte layer may include the second solid electrolyte material, for example, at 50% by weight or more (50 wt % or more) based on the entire solid electrolyte layer.

According to the configuration above, the charge/discharge characteristics of the battery can be further improved.

In addition, the solid electrolyte layer may include the second solid electrolyte material, for example, at 70% by weight or more (70 wt % or more) based on the entire solid electrolyte layer.

According to the configuration above, the charge/discharge characteristics of the battery can be further improved.

Further, the solid electrolyte layer including the second solid electrolyte material as the main component may further include inevitable impurities or starting materials, by-products, decomposition products, etc. used or produced in synthesis of the second solid electrolyte material.

Further, the solid electrolyte layer may include the second solid electrolyte material, for example, at 100% by weight (100 wt %) based on the entire solid electrolyte layer excluding inevitable impurities as contamination.

According to the configuration above, the charge/discharge characteristics of the battery can be further improved.

As described above, the solid electrolyte layer may be constituted of the second solid electrolyte material only.

Further, the solid electrolyte layer may include two or more of the materials mentioned as the second solid electrolyte material. For example, the solid electrolyte layer may include a halide solid electrolyte material and a sulfide solid electrolyte material.

The electrolyte layer 202 may have a thickness of 1 μm or more and 300 μm or less. When the electrolyte layer 202 has a thickness of 1 μm or more, the positive electrode 201 and the negative electrode 203 can be separated from each other. In addition, when the electrolyte layer 202 has a thickness of 300 μm or less, operation at high power can be realized.

The positive electrode 201 and the negative electrode 203 may include a solid electrolyte material. As the solid electrolyte material, the solid electrolyte materials exemplified as the material constituting the electrolyte layer 202 may be used. According to the configuration above, the lithium ion conductivity in the positive electrode 201 and the negative electrode 203 can be enhanced, and high power operation of the battery is possible.

At least one of the positive electrode 201, the electrolyte layer 202, and the negative electrode 203 may include a binder for improving the adhesion between particles. The binder is used for improving the binding properties of the material constituting the electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose. In addition, as the binder, a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used. In addition, a mixture of two or more selected from the above may be used as the binder.

At least one of the positive electrode 201 and the negative electrode 203 may include a conductive assistant for enhancing the electron conductivity. As the conductive assistant, for example, graphites such as natural graphite and artificial graphite, carbon blacks such as acetylene black and Ketjen black, conductive fibers such as carbon fiber and metal fiber, carbon fluoride, metal powders such as aluminum, conductive whiskers such as zinc oxide and potassium titanate, conductive metal oxides such as titanium oxide, and conductive polymer compounds such as polyaniline, polypyrrole, and polythiophene can be used. When a carbon conductive assistant is used, cost reduction can be achieved.

Further, the battery in Embodiment 2 can be configured as batteries of various shapes such as a coin type, a cylindrical type, a square type, a sheet type, a button type, a flat type, and a stacked type.

The operation temperature of the battery is not particularly limited and may be −50° C. to 100° C. The ion conductivity of the coating material of the coating layer 111 is improved with an increase in temperature. In particular, the ion conductivity is dramatically improved at temperature not lower than the melting point of the coating material of the coating layer 111, and high power operation of the battery can be achieved.

EXAMPLES

The present disclosure will now be described in detail using examples and comparative examples but is not limited to the following examples.

Inventive Example 1-1

(Production of First Solid Electrolyte Material)

In an argon glove box having a dew point of −60° C. or less, raw material powders of LiCl and $YCl_3$ were weighed such that the mole ratio of $LiCl:YCl_3$ was 2.7:1.1. Subsequently, the powders were subjected to milling treatment with a planetary ball mill (P-5 type, manufactured by Fritsch) at 600 rpm for 25 hours to obtain a powder of a first solid electrolyte material $Li_{2.7}Y_{1.1}Cl_6$.

(Production of Negative Electrode Active Material-Coating Layer)

In an argon glove box having a dew point of −60° C. or less, $Li_2S$ and $P_2S_5$ were weighed such that the mole ratio of $Li_2S:P_2S_5$ was 75:25. These compounds were pulverized and mixed in a mortar. Subsequently, the mixture was subjected to milling treatment with a planetary ball mill (P-7 type, manufactured by Fritsch) at 510 rpm for 10 hours to provide a vitrified solid electrolyte. The provided vitrified solid electrolyte was heated at 270° C. in an inert atmosphere for 2 hours. Consequently, $Li_2S$—$P_2S_5$, which was a glass-ceramic solid electrolyte, was provided.

In the formation of a $Li_2S$—$P_2S_5$ coating layer on a negative electrode active material (graphite), mixing in an agate mortar was performed. In an argon glove box, a coating material ($Li_2S$—$P_2S_5$) and a negative electrode active material (graphite) were weighed at a weight ratio of 1:4. These materials were mixed in the agate mortar to obtain a coated negative electrode active material.

(Production of Negative Electrode Material)

In an argon glove box, the first solid electrolyte material and the coated negative electrode active material in the inventive example 1-1 were weighed such that the weight proportion of the negative electrode active material (graphite) was 40 wt %. These materials were mixed in an agate mortar to produce a negative electrode material of the inventive example 1-1.

Inventive Example 1-2

(Production of Negative Electrode Active Material-Coating Layer)

In an argon glove box, the coating material ($Li_2S$—$P_2S_5$) of the inventive example 1-1 and a negative electrode active material (graphite) were weighed at a weight ratio of 1:2. These materials were mixed in an agate mortar to provide a coated negative electrode active material.

A negative electrode material of the inventive example 1-2 was provided by the same method as in the inventive example 1-1, except for the production of the negative electrode active material-coating layer.

Inventive Example 1-3

(Production of Negative Electrode Active Material-Coating Layer)

In an argon glove box, the coating material ($Li_2S$—$P_2S_5$) of the inventive example 1-1 and a negative electrode active material (graphite) were weighed at a weight ratio of 1:8. These materials were mixed in an agate mortar to provide a coated negative electrode active material.

A negative electrode material of the inventive example 1-3 was provided by the same method as in the inventive example 1-1, except for the production of the negative electrode active material-coating layer.

Inventive Example 1-4

(Production of First Solid Electrolyte Material)

In an argon glove box having a dew point of −60° C. or less, raw material powders of LiCl, $YCl_3$, and $ZrCl_4$ were weighed such that the mole ratio of $LiCl:YCl_3:ZrCl_4$ was 5:1:1. Subsequently, the powders were subjected to milling treatment with a planetary ball mill (P-5 type, manufactured by Fritsch) at 600 rpm for 25 hours to provide a powder of a first solid electrolyte material $Li_{2.5}Zr_{0.5}Y_{0.5}Cl_6$.

(Production of Negative Electrode Material)

In an argon glove box, the first solid electrolyte material of the inventive example 1-4 and the coated negative electrode active material of the inventive example 1-1 were weighed such that the weight proportion of the negative electrode active material (graphite) was 40 wt %. These materials were mixed in an agate mortar to produce a negative electrode material of the inventive example 1-4.

Inventive Example 1-5

(Production of First Solid Electrolyte Material)

In an argon glove box having a dew point of −60° C. or less, raw material powders of LiBr, LiI, $YCl_3$, and $YBr_3$ were weighed such that the mole ratio of $LiBr:LiI:YCl_3:YBr_3$ was 3:6:2:1. Subsequently, the powders were subjected to milling treatment with a planetary ball mill (P-5 type, manufactured by Fritsch) at 600 rpm for 25 hours to provide a powder of a first solid electrolyte material $Li_3YBr_2Cl_2I_2$.

(Production of Negative Electrode Material)

In an argon glove box, the first solid electrolyte material of the inventive example 1-5 and the coated negative electrode active material of the inventive example 1-1 were weighed such that the weight proportion of the negative electrode active material (graphite) was 40 wt %. These materials were mixed with an agate mortar to produce a negative electrode material of the inventive example 1-5.

Comparative Example 1-1

A negative electrode material of the comparative example 1-1 was provided by the same method as in the inventive example 1-1, except that the negative electrode active material-coating layer was not produced, and graphite on which the coating layer was not formed was used.

Comparative Example 1-2

A negative electrode material of the comparative example 1-2 was provided by the same method as in the inventive example 1-4, except that the negative electrode active material-coating layer was not produced, and graphite on which the coating layer was not formed was used.

Comparative Example 1-3

A negative electrode material of The comparative example 1-3 was prepared by the same method as in the inventive example 1-5, except that the negative electrode active material-coating layer was not produced, and graphite on which the coating layer was not formed was used.

(Production of Battery)

The negative electrode materials of the inventive examples 1-1 to 1-5 and The comparative examples 1-1 to 1-3 described above were evaluated using electrochemical cells.

First, 80 mg of $Li_2S—P_2S_5$ and 12 mg of the negative electrode material were stacked in this order in an insulating outer cylinder, and then, were pressure-molded with a pressure of 370 MPa to provide a negative electrode and a solid electrolyte layer.

Then, a metal In (thickness: 200 μm), a metal Li (thickness: 300 μm), and a metal In (thickness: 200 μm) were stacked in this order on a surface of the solid electrolyte layer opposite to a surface in contact with the negative electrode, and then, were pressure-molded with a pressure of 80 MPa to form a bipolar electrochemical cell composed of the negative electrode (working electrode), the solid electrolyte layer, and a counter electrode.

Then, stainless steel current collectors were disposed on the top and the bottom of the resulting layered product, and current collecting leads were attached to the current collectors.

Then, the inside of the insulating outer cylinder was shielded and sealed hermetically from the outside atmosphere with an insulating ferrule.

Finally, the electrochemical cell was tied up with four bolts from the top and the bottom to apply a surface pressure of 150 MPa to the layered product composed of the negative electrode (working electrode), the solid electrolyte layer, and the counter electrode.

As described above, batteries of the inventive examples 1-1 to 1-5 and the comparative examples 1-1 to 1-3 described above were each produced.

(Charge/Discharge Test)

A charge/discharge test was performed using each of the batteries of the inventive examples 1-1 to 1-5 and The comparative examples 1-1 to 1-3 described above under the following conditions.

The battery was placed in a thermostat of 25° C.

Constant-current charging was performed at a current value of 70 μA, which was 0.04C rate (24-hour rate) to the theoretical capacity of the negative electrode active material (graphite). The charge was terminated when a charging capacity reached 360 mAh/g (97% of the theoretical capacity, 372 mAh/g, of graphite).

Then, discharging was likewise performed at a current value of 70 μA, which was 0.04C rate. The discharge was terminated when the voltage reached 0 V.

As described above, the initial charge/discharge efficiency (=initial discharging capacity/initial charging capacity) of each of the batteries of the inventive examples 1-1 to 1-5 and The comparative examples 1-1 to 1-3 described above was obtained. The results are shown in the following Table 1.

TABLE 1

| | First solid electrolyte material | Coating layer material | Weight proportion wt % | Charge/ discharge efficiency % |
|---|---|---|---|---|
| Inventive example 1-1 | $Li_{2.7}Y_{1.1}Cl_6$ | $Li_2S—P_2S_5$ | 25 | 40.5 |
| Inventive example 1-2 | $Li_{2.7}Y_{1.1}Cl_6$ | $Li_2S—P_2S_5$ | 50 | 51.3 |
| Inventive example 1-3 | $Li_{2.7}Y_{1.1}Cl_6$ | $Li_2S—P_2S_5$ | 13 | 36.8 |
| Inventive example 1-4 | $Li_{2.5}Y_{0.5}Zr_{0.5}Cl_6$ | $Li_2S—P_2S_5$ | 25 | 35.5 |
| Inventive example 1-5 | $Li_3YBr_2Cl_2I_2$ | $Li_2S—P_2S_5$ | 25 | 71.5 |
| Comparative example 1-1 | $Li_{2.7}Y_{1.1}Cl_6$ | None | 0 | 28.6 |
| Comparative example 1-2 | $Li_{2.5}Y_{0.5}Zr_{0.5}Cl_6$ | None | 0 | 22.2 |
| Comparative example 1-3 | $Li_3YBr_2Cl_2I_2$ | None | 0 | 69.6 |

DISCUSSION

The results of the inventive examples 1-1 to 1-5 and the comparative examples 1-1 to 1-3 shown in Table 1 demonstrate that the charge/discharge efficiency of a battery is improved by including a first solid electrolyte material represented by a compositional formula: $Li_\alpha M_\beta X_\gamma$, where α, β, and γ are values larger than 0; M includes at least one of metal elements other than Li and metalloid elements; and X is one or more elements selected from the group consisting of Cl, Br, and I, and providing a coating layer including a coating material on the surface of a negative electrode active material.

The results of the inventive examples 1-1 to 1-3 and the comparative example 1-1 shown in Table 1 demonstrate that the charge/discharge efficiency is improved regardless of the supported amount of the sulfide solid electrolyte forming the coating layer.

The results of the inventive examples 1-1, 1-4, and 1-5 and the comparative examples 1-1 to 1-3 shown in Table 1 demonstrate that the charge/discharge efficiency is improved regardless of the type of the first solid electrolyte material included in the electrode material.

Inventive Example 2-1

(Production of First Solid Electrolyte Material)

In an argon glove box having a dew point of −60° C. or less, raw material powders of LiCl and YCl$_3$ were weighed such that the mole ratio of LiCl:YCl$_3$ was 2.7:1.1. Subsequently, the powders were subjected to milling treatment with a planetary ball mill (P-5 type, manufactured by Fritsch) at 600 rpm for 25 hours to prepare a powder of a first solid electrolyte material Li$_{2.7}$Y$_{1.1}$Cl$_6$.

(Production of Negative Electrode Active Material-Coating Layer)

A polymer compound polyethylene oxide (PEO, molecular weight: 4×10$^6$) and a lithium salt LiCF$_3$SO$_3$ (i.e., LiTFS) were weighed such that the mole ratio of ethylene oxide unit:lithium salt was 10:1. The mixture was dissolved in acetonitrile to produce a polymer electrolyte PEO-LiTFS composite solution. A coating material (PEO-LiTFS) and a negative electrode active material (graphite) were weighed at a weight ratio of 1:8, and the graphite was added to the polymer electrolyte solution, followed by dispersion with an ultrasonic disperser and then mixing with a planetary centrifugal mixer (ARE-310, manufactured by THINKY) at 1600 rpm for 3 minutes. The resulting product was spread on a petri dish and was vacuum-dried at 70° C. for 1 hour to provide a coated negative electrode active material.

(Production of Negative Electrode Material)

In an argon glove box, the first solid electrolyte material and the coated negative electrode active material of the inventive example 2-1 were weighed such that the negative electrode active material (graphite) was 40 wt % of the total amount. These materials were mixed in an agate mortar to produce a negative electrode material of the inventive example 2-1.

Inventive Example 2-2

(Production of Negative Electrode Active Material-Coating Layer)

In the production of the negative electrode active material-coating layer, the coating material (PEO-LiTFS) and a negative electrode active material (graphite) were mixed at a weight ratio of 1:40 to provide a coated negative electrode active material.

A negative electrode material of the inventive example 2-2 was prepared by the same method as in the inventive example 2-1, except for the production of the negative electrode active material-coating layer.

Inventive Example 2-3

(Production of Negative Electrode Active Material-Coating Layer)

In the production of a negative electrode active material-coating layer, the coating material (PEO-LiTFS) and a negative electrode active material (graphite) were mixed at a weight ratio of 1:4 to provide a coated negative electrode active material.

A negative electrode material of the inventive example 2-3 was prepared by the same method as in the inventive example 2-1, except for the production of the negative electrode active material-coating layer.

Inventive Example 2-4

(Production of Negative Electrode Active Material-Coating Layer)

A polymer compound polyethylene oxide (PEO, molecular weight: 4×10$^6$) and a lithium salt LiN(SO$_2$CF$_3$)$_2$ (i.e., LiTFSI) were weighed such that the mole ratio of ethylene oxide unit:lithium salt was 10:1. The mixture was dissolved in acetonitrile to produce a polymer electrolyte PEO-LiTFSI composite solution. A coating material (PEO-LiTFSI) and a negative electrode active material (graphite) were weighed at a weight ratio of 1:8, and the graphite was added to the polymer electrolyte solution, followed by dispersion with an ultrasonic disperser and then mixing with a planetary centrifugal mixer (ARE-310, manufactured by THINKY) at 1600 rpm for 3 minutes. The resulting product was spread on a petri dish and was vacuum-dried at 70° C. for 1 hour to prepare a coated negative electrode active material.

(Production of Negative Electrode Material)

In an argon glove box, the first solid electrolyte material of the inventive example 2-1 and the coated negative electrode active material of the inventive example 2-4 were weighed such that the negative electrode active material (graphite) was 40 wt % of the total amount. These materials were mixed in an agate mortar to produce a negative electrode material of the inventive example 2-4.

Inventive Example 2-5

(Production of Negative Electrode Active Material-Coating Layer)

A polymer compound polyethylene oxide (PEO, molecular weight: 4×10$^6$) and a lithium salt LiN(SO$_2$F)$_2$ (i.e., LiFSI) were weighed such that the mole ratio of ethylene oxide unit:lithium salt was 10:1. The mixture was dissolved in acetonitrile to produce a polymer electrolyte PEO-LiFSI composite solution. A coating material (PEO-LiFSI) and a negative electrode active material (graphite) were weighed at a weight ratio of 1:8, and the graphite was added to the polymer electrolyte solution, followed by dispersion with an ultrasonic disperser and then mixing with a planetary centrifugal mixer (ARE-310, manufactured by THINKY) at 1600 rpm for 3 minutes. The resulting product was spread on a petri dish and was vacuum-dried at 70° C. for 1 hour to provide a coated negative electrode active material.

(Production of Negative Electrode Material)

In an argon glove box, the first solid electrolyte material of the inventive example 2-1 and the coated negative electrode active material of the inventive example 2-5 were weighed such that the negative electrode active material (graphite) was 40 wt % of the total amount. These materials were mixed in an agate mortar to produce a negative electrode material of the inventive example 2-5.

Inventive Example 2-6

(Production of First Solid Electrolyte Material)

In an argon glove box having a dew point of −60° C. or less, raw material powders of LiCl, YCl$_3$ and ZrCl$_4$ were weighed such that the mole ratio of LiCl:YCl$_3$:ZrCl$_4$ was 5:1:1. Subsequently, the powders were subjected to milling treatment with a planetary ball mill (P-5 type, manufactured by Fritsch) at 600 rpm for 25 hours to provide a powder of a first solid electrolyte material Li$_{2.5}$Zr$_{0.5}$Y$_{0.5}$Cl$_6$.

(Production of Negative Electrode Material)

In an argon glove box, the first solid electrolyte material of the inventive example 2-6 and the coated negative electrode active material of the inventive example 2-5 were weighed such that the weight proportion of the negative electrode active material (graphite) was 40 wt %. These materials were mixed in an agate mortar to produce a negative electrode material of the inventive example 2-6.

Comparative Example 2-1

A negative electrode material of The comparative example 2-1 was provided by the same method as in the inventive example 2-1, except that the negative electrode active material-coating layer was not produced, and graphite on which the coating layer was not formed was used.

Comparative Example 2-2

A negative electrode material of The comparative example 2-2 was provided by the same method as in the inventive example 2-6, except that the negative electrode active material-coating layer was not produced, and graphite on which the coating layer was not formed was used.

(Production of Sulfide Solid Electrolyte Material)

In an argon glove box having a dew point of −60° C. or less, $Li_2S$ and $P_2S_5$ were weighed such that the mole ratio of $Li_2S:P_2S_5$ was 75:25. These compounds were pulverized and mixed in a mortar. Subsequently, the mixture was subjected to milling treatment with a planetary ball mill (P-7 type, manufactured by Fritsch) at 510 rpm for 10 hours to provide a vitrified solid electrolyte. The provided vitrified solid electrolyte was heated at 270° C. in an inert atmosphere for 2 hours. Consequently, $Li_2S$—$P_2S_5$, which was a glass-ceramic solid electrolyte, was provided.

(Production of Battery)

The negative electrode materials of the inventive examples 2-1 to 2-6 and The comparative examples 2-1 and 2-2 described above were evaluated using electrochemical cells.

First, 80 mg of $Li_2S$—$P_2S_5$ and 12 mg of the negative electrode material were stacked in this order in an insulating outer cylinder, and then, were pressure-molded with a pressure of 370 MPa to provide a negative electrode and a solid electrolyte layer.

Then, a metal In (thickness: 200 μm), a metal Li (thickness: 300 μm), and a metal In (thickness: 200 μm) were stacked in this order on a surface of the solid electrolyte layer opposite to a surface in contact with the negative electrode, and then, were pressure-molded with a pressure of 80 MPa to form a bipolar electrochemical cell composed of the negative electrode (working electrode), the solid electrolyte layer, and a counter electrode.

Then, stainless steel current collectors were disposed on the top and the bottom of the resulting layered product, and current collecting leads were attached to the current collectors.

Then, the inside of the insulating outer cylinder was shielded and sealed hermetically from the outside atmosphere with an insulating ferrule.

Finally, the electrochemical cell was tied up with four bolts from the top and the bottom to apply a surface pressure of 150 MPa to the layered product composed of the negative electrode (working electrode), the solid electrolyte layer, and the counter electrode. As described above, batteries of the inventive examples 2-1 to 2-6 and the comparative examples 2-1 and 2-2 described above were each produced.

(Charge/Discharge Test)

A charge/discharge test was performed using each of the batteries of the inventive examples 2-1 to 2-6 and the comparative examples 2-1 and 2-2 described above under the following conditions.

The battery was placed in a thermostat of 70° C.

Constant-current charging was performed at a current value of 70 μA, which was 0.04C rate (24-hour rate) to the theoretical capacity of the negative electrode active material (graphite). The charge was terminated when a charging capacity reached 360 mAh/g (97% of the theoretical capacity, 372 mAh/g, of graphite).

Then, discharging was likewise performed at a current value of 70 μA, which was 0.04C rate. The discharge was terminated when the voltage reached 0 V.

As described above, the initial charge/discharge efficiency (=initial discharging capacity/initial charging capacity) of each of the batteries of the inventive examples 2-1 to 2-6 and the comparative examples 2-1 and 2-2 described above was obtained. The results are shown in the following Table 2.

TABLE 2

| | First solid electrolyte material | Coating layer material | Weight proportion wt % | Charge/discharge efficiency % |
|---|---|---|---|---|
| Inventive example 2-1 | $Li_{2.7}Y_{1.1}Cl_6$ | PEO—LiTFS | 13 | 26.4 |
| Inventive example 2-2 | $Li_{2.7}Y_{1.1}Cl_6$ | PEO—LiTFS | 3 | 19.1 |
| Inventive example 2-3 | $Li_{2.7}Y_{1.1}Cl_6$ | PEO—LiTFS | 25 | 26.9 |
| Inventive example 2-4 | $Li_{2.7}Y_{1.1}Cl_6$ | PEO—LiTFSI | 13 | 29.1 |
| Inventive example 2-5 | $Li_{2.7}Y_{1.1}Cl_6$ | PEO—LiFSI | 13 | 25.8 |
| Inventive example 2-6 | $Li_{2.5}Y_{0.5}Zr_{0.5}Cl_6$ | PEO—LiFSI | 13 | 25.0 |
| Comparative example 2-1 | $Li_{2.7}Y_{1.1}Cl_6$ | None | 0 | 16.9 |
| Comparative example 2-2 | $Li_{2.5}Y_{0.5}Zr_{0.5}Cl_6$ | None | 0 | 18.9 |

DISCUSSION

The results of the inventive examples 2-1 to 2-6 and the comparative examples 2-1 to 2-2 shown in Table 2 demonstrate that the charge/discharge efficiency of a battery is improved by including a first solid electrolyte material represented by a compositional formula: $Li_\alpha M_\beta X_\gamma$, where α, β, and γ are values larger than 0; M includes at least one of metal elements other than Li and metalloid elements; and X is one or more elements selected from the group consisting of Cl, Br, and I, and providing a coating layer including a coating material on the surface of a negative electrode active material.

The results of the inventive examples 2-1 to 2-3 and the comparative example 2-1 shown in Table 2 demonstrate that the charge/discharge efficiency is improved regardless of the weight ratio of the polymer solid electrolyte forming the coating layer.

The results of the inventive examples 2-1, 2-4, and 2-5 and the comparative example 2-1 shown in Table 2 demonstrate that the charge/discharge efficiency is improved regardless of the type of the polymer solid electrolyte forming the coating layer.

The results of the inventive examples 2-5 and 2-6 and the comparative examples 2-1 and 2-2 shown in Table 2 demonstrate that the charge/discharge efficiency is improved regardless of the type of the first solid electrolyte material included in the electrode material.

Inventive Example 3-1

(Production of First Solid Electrolyte Material)

In an argon glove box having a dew point of −60° C. or less, raw material powders of LiCl and YCl$_3$ were weighed such that the mole ratio of LiCl:YCl$_3$ was 2.7:1.1. Subsequently, the powders were subjected to milling treatment with a planetary ball mill (P-5 type, manufactured by Fritsch) at 600 rpm for 25 hours to provide a powder of a first solid electrolyte material Li$_{2.7}$Y$_{1.1}$Cl$_6$.

(Production of Negative Electrode Active Material-Coating Layer)

A film of Li$_3$PO$_4$ was formed on a surface of a negative electrode active material (natural graphite) by an atomic layer deposition method (ALD method) to obtain a coated negative electrode active material.

(Production of Negative Electrode Material)

In an argon glove box, the first solid electrolyte material of the inventive example 3-1 and the coated negative electrode active material (graphite on which the coating layer was formed) of the inventive example 3-1 were weighed at a weight ratio of 40:60. These materials were mixed in an agate mortar to produce a negative electrode material of the inventive example 3-1.

Inventive Example 3-2

(Production of Negative Electrode Active Material-Coating Layer)

A film of Li$_4$Ti$_5$O$_{12}$ (hereinafter, written as LTO) was formed on a surface of a negative electrode active material (natural graphite) by a sputtering method to obtain a coated negative electrode active material.

A negative electrode material of the inventive example 3-2 was provided by the same method as in the inventive example 3-1, except for the production of the negative electrode active material-coating layer.

Inventive Example 3-3

(Production of Negative Electrode Active Material-Coating Layer)

A film of SiO$_2$ was formed on a surface of a negative electrode active material (natural graphite) by a sputtering method to obtain a coated negative electrode active material.

A negative electrode material of the inventive example 3-3 was provided by the same method as in the inventive example 3-1, except for the production of the negative electrode active material-coating layer.

Comparative Example 3-1

A negative electrode material of the comparative example 3-1 was provided by the same method as in the inventive example 3-1, except that the negative electrode active material-coating layer was not produced, and natural graphite not provided with a coating layer was used.

(Production of Sulfide Solid Electrolyte Material)

In an argon glove box having a dew point of −60° C. or less, Li$_2$S and P$_2$S$_5$ were weighed such that the mole ratio of Li$_2$S:P$_2$S$_5$ was 75:25. These compounds were pulverized and mixed in a mortar. Subsequently, the mixture was subjected to milling treatment with a planetary ball mill (P-7 type, manufactured by Fritsch) at 510 rpm for 10 hours to provide a vitrified solid electrolyte. The resulting vitrified solid electrolyte was heated at 270° C. in an inert atmosphere for 2 hours. Consequently, Li$_2$S—P$_2$S$_5$, which was a glass-ceramic solid electrolyte, was provided.

(Production of Battery)

The negative electrode materials of the inventive examples 3-1 to 3-3 and the comparative example 3-1 described above were evaluated using electrochemical cells.

First, 80 mg of Li$_2$S—P$_2$S$_5$ and 12 mg of the negative electrode material were stacked in this order in an insulating outer cylinder, and then, were pressure-molded with a pressure of 740 MPa to prepare a negative electrode and a solid electrolyte layer.

Then, a metal In (thickness: 200 μm), a metal Li (thickness: 300 μm), and a metal In (thickness: 200 μm) were stacked in this order on a surface of the solid electrolyte layer opposite to a surface in contact with the negative electrode, and then, were pressure-molded with a pressure of 80 MPa to form a bipolar electrochemical cell composed of the negative electrode (working electrode), the solid electrolyte layer, and a counter electrode.

Then, stainless steel current collectors were disposed on the top and the bottom of the layered product, and current collecting leads were attached to the current collectors.

Then, the inside of the insulating outer cylinder was shielded and sealed hermetically from the outside atmosphere with an insulating ferrule.

Finally, the electrochemical cell was tied up with four bolts from the top and the bottom to apply a surface pressure of 150 MPa to the layered product composed of the negative electrode (working electrode), the solid electrolyte layer, and the counter electrode.

As described above, batteries of the inventive examples 3-1 to 3-3 and the comparative example 3-1 described above were each produced.

(Charge/Discharge Test)

A charge/discharge test was performed using each of the batteries of the inventive examples 3-1 to 3-3 and the comparative example 3-1 described above under the following conditions.

The battery was placed in a thermostat of 70° C.

Constant-current charging was performed at a current value of 70 μA, which was 0.04C rate (24-hour rate). The charge was terminated when a charging capacity reached 360 mAh/g (97% of the theoretical capacity, 372 mAh/g, of graphite).

Then, discharging was likewise performed at a current value of 70 μA, which was 0.04C rate. The discharge was terminated when the voltage reached 0 V.

As described above, the initial charge/discharge efficiency (=initial discharging capacity/initial charging capacity) of each of the batteries of the inventive examples 3-1 to 3-3 and the comparative example 3-1 described above was obtained. The results are shown in the following Table 3.

TABLE 3

| | First solid electrolyte material | Coating layer material | Charge/discharge efficiency % |
|---|---|---|---|
| Inventive example 3-1 | Li$_{2.7}$Y$_{1.1}$Cl$_6$ | Li$_3$PO$_4$ | 28.3 |
| Inventive example 3-2 | Li$_{2.7}$Y$_{1.1}$Cl$_6$ | Li$_4$Ti$_5$O$_{12}$ | 27.2 |
| Inventive example 3-3 | Li$_{2.7}$Y$_{1.1}$Cl$_6$ | SiO$_2$ | 25.5 |
| Comparative example 3-1 | Li$_{2.7}$Y$_{1.1}$Cl$_6$ | None | 20.8 |

Discussion

The results of the inventive examples 3-1 to 3-3 and the comparative example 3-1 shown in Table 3 demonstrate that the charge/discharge efficiency of a battery is improved by including a first solid electrolyte material represented by a compositional formula: $Li_\alpha M_\beta X_\gamma$, where $\alpha$, $\beta$, and $\gamma$ are values larger than 0; M includes at least one of metal elements other than Li and metalloid elements; and X is one or more elements selected from the group consisting of Cl, Br, and I, and providing a coating layer including a coating material on a surface of a negative electrode active material.

In addition, the results of the inventive examples 3-1 to 3-3 and the comparative example 3-1 shown in Table 3 demonstrate that the charge/discharge efficiency is improved regardless of the type of the oxide material forming the coating layer.

INDUSTRIAL APPLICABILITY

The battery of the present disclosure can be used, for example, as an all-solid lithium secondary battery.

REFERENCE SIGNS LIST

1000 Electrode material
100 First solid electrolyte particle
110 Electrode active material particle
111 Coating layer
2000, 3000 Battery
201 Positive electrode
202 Electrolyte layer
203 Negative electrode

The invention claimed is:

1. An electrode material comprising:
an electrode active material;
a first solid electrolyte material; and
a coating material, wherein:
the first solid electrolyte material includes Li, M, and X, where
  M includes at least one selected from the group consisting of metal elements other than Li and metalloid elements; and
  X is at least one selected from the group consisting of Cl, Br, and I,
the first solid electrolyte material does not include sulfur,
the coating material is located on a surface of the electrode active material, and
the coating material is a sulfide solid electrolyte.

2. The electrode material according to claim 1, wherein the sulfide solid electrolyte includes lithium sulfide and phosphorus sulfide.

3. The electrode material according to claim 1, wherein the sulfide solid electrolyte is $Li_2S$—$P_2S_5$.

4. A battery comprising:
a positive electrode;
a negative electrode; and
an electrolyte layer provided between the positive electrode and the negative electrode, wherein at least one of the positive electrode or the negative electrode includes the electrode material according to claim 1.

5. An electrode material comprising:
an electrode active material including graphite;
a first solid electrolyte material; and
a coating material, wherein:
the first solid electrolyte material is represented by the following compositional formula (1):

$$Li_\alpha M_\beta X_\gamma \qquad \text{Formula (1)}$$

where
  $2.5 \leq \alpha \leq 2.7$, $1 \leq \beta \leq 1.1$, and $\gamma = 6$ are satisfied;
  M includes yttrium; and
  X is at least one selected from the group consisting of Cl, Br, and I,
the coating material is located on a surface of the electrode active material, and
the coating material is at least one selected from the group consisting of an oxynitride solid electrolyte, $SiO_2$, $TiO_2$, $B_2O_3$, $Nb_2O_5$, $WO_3$, a Li—P—O compound, a Li—Al—O compound, a Li—Si—O compound, a Li—S—O compound, a Li—Mo—O compound, a Li-V-O compound, and a Li—W—O compound.

6. A battery comprising:
a positive electrode;
a negative electrode; and
an electrolyte layer provided between the positive electrode and the negative electrode, wherein
at least one of the positive electrode and the negative electrode includes the electrode material according to claim 5.

* * * * *